United States Patent
Koizumi et al.

(10) Patent No.: US 11,731,586 B2
(45) Date of Patent: Aug. 22, 2023

(54) LOCKING AND UNLOCKING MODULE AND DOOR HANDLE MODULE

(71) Applicant: AISIN CORPORATION, Aichi (JP)

(72) Inventors: Takaaki Koizumi, Kariya (JP); Yuki Hayashi, Kariya (JP)

(73) Assignee: AISIN CORPORATION, Kariya (JP)

( * ) Notice: Subject to any disclaimer, the term of this patent is extended or adjusted under 35 U.S.C. 154(b) by 301 days.

(21) Appl. No.: 17/140,199

(22) Filed: Jan. 4, 2021

(65) Prior Publication Data

US 2021/0237689 A1 Aug. 5, 2021

(30) Foreign Application Priority Data

Jan. 30, 2020 (JP) .................. 2020-013910

(51) Int. Cl.
*B60R 25/24* (2013.01)
*G07C 9/00* (2020.01)

(52) U.S. Cl.
CPC ........ *B60R 25/245* (2013.01); *G07C 9/00309* (2013.01); *G07C 2009/00769* (2013.01); *G07C 2209/63* (2013.01)

(58) Field of Classification Search
CPC .............. B60R 25/245; G07C 9/00309; G07C 2009/00769; G07C 2209/63
See application file for complete search history.

(56) References Cited

U.S. PATENT DOCUMENTS

| | | |
|---|---|---|
| 2011/0140479 A1 | 6/2011 | Okada et al. |
| 2013/0099892 A1 | 4/2013 | Tucker et al. |
| 2017/0050616 A1 | 2/2017 | Liubakka et al. |
| 2020/0185818 A1* | 6/2020 | Kim .......................... H01Q 5/25 |
| 2021/0102415 A1* | 4/2021 | Scheibe .................. E05B 81/78 |
| 2021/0160998 A1* | 5/2021 | Sieg ........................ E05B 81/77 |

FOREIGN PATENT DOCUMENTS

| | | |
|---|---|---|
| JP | 2007-254993 A | 10/2007 |
| WO | WO 2010/143292 A1 | 12/2010 |

* cited by examiner

*Primary Examiner* — Nabil H Syed
(74) *Attorney, Agent, or Firm* — Oblon, McClelland, Maier & Neustadt, L.L.P.

(57) ABSTRACT

A module includes a first antenna that performs, with a wireless communication terminal, communication for determining whether unlocking or locking of a door of a vehicle is enabled, a first board being installed with the first antenna, and a housing that houses the first board. The housing is housed in a support frame of a body of the door that supports an open and close operation portion of the door outside in a width direction of the vehicle in such a way as to be operatable.

8 Claims, 5 Drawing Sheets

LOCKING AND UNLOCKING MODULE AND DOOR HANDLE MODULE

CROSS REFERENCE TO RELATED APPLICATIONS

This application is based on and claims priority under 35 U.S.C. § 119 to Japanese Patent Application 2020-013910, filed on Jan. 30, 2020, the entire content of which is incorporated herein by reference.

TECHNICAL FIELD

This disclosure generally relates to a locking and unlocking module of a door of a vehicle and a door handle module being installed with the locking and unlocking module.

BACKGROUND DISCUSSION

A vehicle, a door for a vehicle (hereinafter described as a vehicular door), a door handle, or the like that achieves unlocking or locking (hereinafter described as locking and unlocking) of a vehicular door by wireless communication becomes widespread. A system achieving such locking and unlocking is referred to as, for example, a keyless entry system or the like.

JP2007-254993A (Reference 1) describes one example of a keyless entry system including a body device installed in a vehicle, and a mobile device (wireless communication terminal) carried by an operator. The body device includes a control unit, a transmission-reception unit, an antenna, and a power transmission unit. The control unit includes a microcomputer, and performs control of the entire body device, control of the power transmission unit and a door lock actuator, and the like. The control unit communicates with the mobile device via the transmission-reception unit and the antenna, and performs control of the door lock actuator that performs locking and unlocking of a door lock mechanism in response to a communication result with the mobile device.

In such a keyless entry system, as described in US2013/0099892A1 (Reference 2) and US2017/0050616A1 (Reference 3), for communication between the wireless communication terminal serving as a key device and a vehicle side, a communication method suitable for near-range communication or long-range communication can be selected according to a usage manner of the keyless entry system.

Reference 2 describes the disclosure related to access to a vehicle by a portable computing device (wireless communication terminal) such as a so-called smartphone. According to the disclosure, unlocking of a door of a vehicle is achieved by wireless communication between the smartphone and the vehicle. As one example of the wireless communication, usage of a communication method suitable for long-range communication such as Bluetooth (registered trademark) and Wi-Fi (registered trademark) and another communication method that achieves near-range communication is exemplified.

Reference 3 describes a keyless entry system of a vehicle using near field communication (NFC). An NFC assembly on a vehicle side is disposed above a door of a driver or in the vicinity thereof, and includes, for example, a B pillar trim, a belt line molding, a mirror housing, or a door handle. A circuit and the like that achieve such a keyless entry system may be installed in a door handle to be touched when a passenger or a user (hereinafter described as a user) of a vehicle gets on the vehicle.

WO2010/143292A1 pamphlet (Reference 4) is related to a conventional smart key system, and describes that a part of a circuit such as an antenna and a sensor is often mounted on a door handle, and a control circuit is often mounted in a vehicle. Further, a door handle including an electromagnetic coupling device is proposed in order to achieve transmission of a signal between the circuit on the door handle side and the circuit in the vehicle in a noncontact manner. In the door handle that includes the electromagnetic coupling device and on which a part of the circuit that achieves the smart key system is mounted, power is supplied from a vehicle door to the circuit via the electromagnetic coupling device.

As described above, various communication methods are used in the keyless entry system, and the communication methods have a strong point and a weak point in terms of each method. Thus, when convenience of a user is considered, it is desired that a suitable communication method can be used according to a demand of the user such as a wish and a preference in a circuit that achieves the keyless entry system, a device being installed with the circuit, or the like (hereinafter described as a locking and unlocking module). Then, it is desired that locking and unlocking by such a locking and unlocking module can be performed by an operation and in a position that have been conventionally familiar to a user and are similar to those in a case where locking and unlocking are performed by a key.

A need thus exists for a locking and unlocking module and a door handle module which are not susceptible to the drawback mentioned above.

SUMMARY

A locking and unlocking module according to this disclosure includes a communication unit that performs, with a wireless communication terminal, communication for determining whether unlocking or locking of a door of a vehicle is enabled, a board being installed with the communication unit, and a housing that houses the board. The housing is housed in a support frame of a body of the door that supports an open and close operation portion of the door outside in a width direction of the vehicle in such a way as to be operatable.

A door handle module according to this disclosure includes the locking and unlocking module described above, an open and close operation portion of a door of a vehicle, and a support frame that is disposed inside a body of the door in a width direction of the vehicle, and supports the open and close operation portion outside the body in the width direction of the vehicle in such a way as to be operatable. The support frame includes a module holding portion that houses the locking and unlocking module. Note that the width direction of the vehicle refers to a direction that intersects the front-rear direction and is parallel to the ground.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

A locking and unlocking module and a door handle module being installed with the locking and unlocking module according to an embodiment of this disclosure will be described with reference to the drawings.

(Overview of Locking and Unlocking Module and Determination of Locking and Unlocking)

Figure 1:
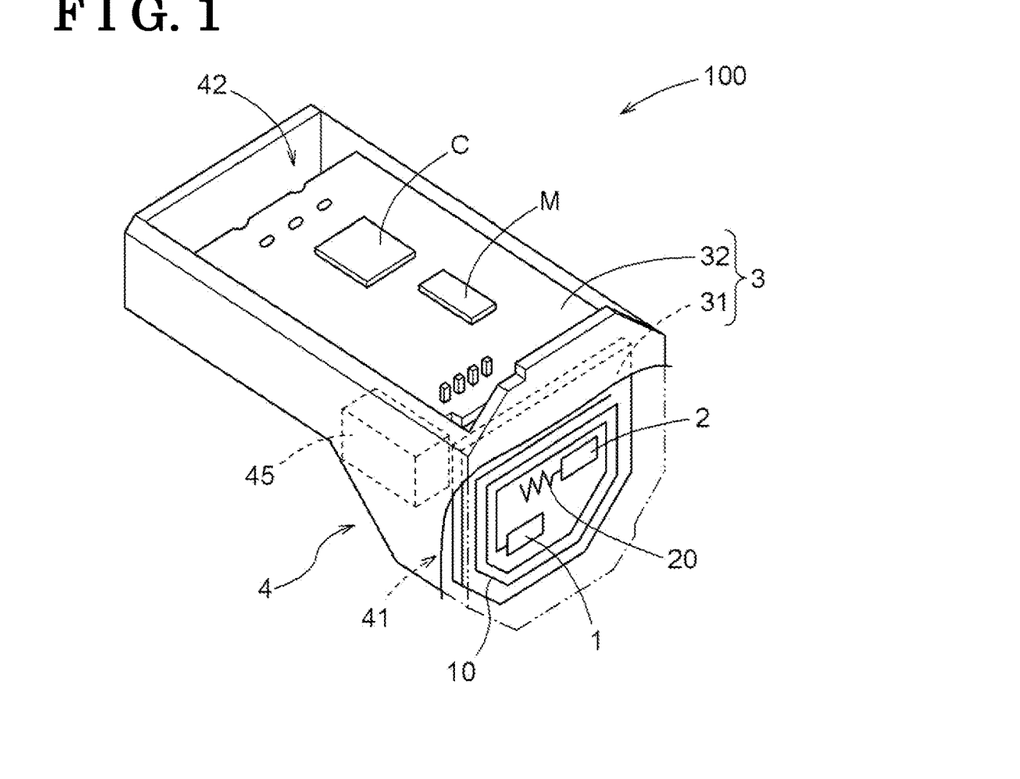
FIG. 1 is a perspective view of a locking and unlocking module.

FIG. 1 illustrates a locking and unlocking module (hereinafter described as a module 100) that performs communication for determining whether unlocking or locking (hereinafter simply referred to as locking and unlocking) is enabled, and is installed with a processor C (one example of a control unit) for communication control that sends a communication result to an electronic control unit (ECU) of a vehicle in which whether locking or unlocking is enabled is determined.

Figure 2:
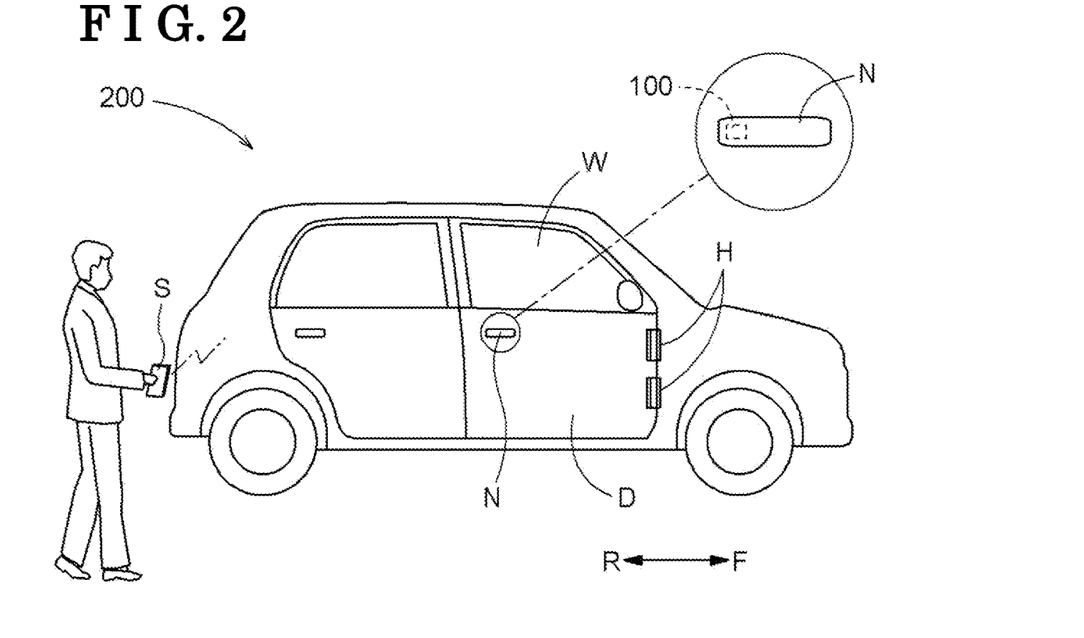
FIG. 2 is a side view of a vehicle being installed with the locking and unlocking module.

As illustrated in FIG. 2, the module 100 is installed (fixed) in a door D of a vehicle 200, and performs communication for determining whether locking and unlocking of the door D is enabled. FIG. 2 illustrates a forward direction in a traveling direction of the vehicle 200 as the front F, and an opposite thereof as the rear R. Hereinafter, the same direction as the traveling direction of the vehicle 200 is simply described as a front-rear direction. The door D of the vehicle 200 can open and be closed by being supported by a hinge H on the front F side thereof. A window W is provided on an upper side in a vertical direction of the door D, and a door handle N (one example of a door handle module) is disposed in a position below the window W and closer to the rear R side of the door D. The module 100 is installed in the door handle N.

The module 100 performs wireless communication with a wireless communication terminal (for example, a smartphone. Hereinafter described as a terminal S) being installed with a storage battery device. The storage battery device in the present embodiment refers to a primary battery, a secondary battery that can be charged and discharged, a condenser, a capacitor, and the like. The processor C controls wireless communication, and also sends a result (communication result) of the wireless communication to an ECU. When the ECU determines that locking and unlocking can be performed and a request for locking and unlocking is received, the ECU sends a command that instructs a locking and unlocking mechanism (not illustrated) of the door D to unlock or lock the door D.

The module 100 is configured to be able to communicate with the terminal S in two types of communication methods of a near-range wireless communication method (one example of a first communication method) and a long-range wireless communication method (one example of a second communication method). Hereinafter, communication that does not specify either the near-range wireless communication method or the long-range wireless communication method is simply described as communication. Further, communication performed by the near-range wireless communication method is described as first communication. Further, communication performed by the long-range wireless communication method is described as second communication.

Figure 3:
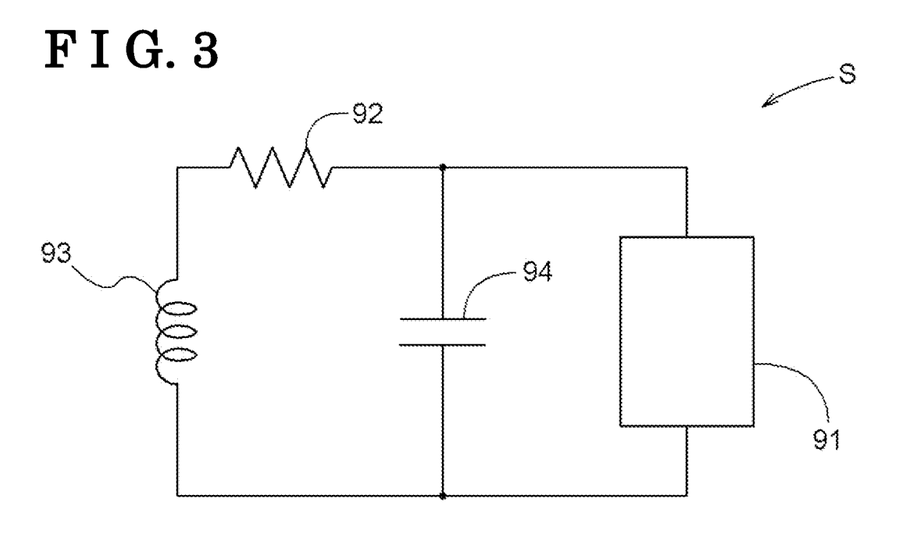
FIG. 3 is a schematic diagram of a circuit of a wireless communication terminal.

The terminal S includes a circuit as illustrated in FIG. 3, and is configured to be able to perform at least the first communication. The terminal S includes, as electronic components that constitute the circuit for performing the first communication and the like, a terminal antenna 93, a terminal circuit 91 that drives the terminal antenna 93 and transmits an electromagnetic wave, and receives the electromagnetic wave in the terminal antenna 93 and acquires energy and information, a resistor 92, and a condenser 94. In the terminal S, the terminal antenna 93, the condenser 94, and the terminal circuit 91 are electrically connected in parallel, and one end sides of the terminal antenna 93 and the condenser 94 are electrically connected to each other via the resistor 92.

Hereinafter, description is given while exemplifying a case where the first communication is performed in an NFC communication method, and a communication system installed in the terminal S operates with, as an energy source, an electromagnetic wave supplied from the module 100 when the communication system performs the first communication. Further, hereinafter, description is given while exemplifying a case where the second communication is performed in a method conforming to Bluetooth (registered trademark), and the communication system installed in the terminal S can operate with power supplied from a secondary battery (not illustrated) installed in the terminal S. The NFC communication method and Bluetooth are a known communication method, and thus detailed description of the communication method and detailed description of a circuit that achieves the communication will be appropriately omitted. Further, the first communication performed in the NFC communication method can also be performed with a card-type terminal (so-called NFC card) that is not installed with a storage battery device, and locking and unlocking can also be performed by the card-type terminal, but detailed description will be omitted.

Locking and unlocking by the module 100 are performed as follows. In other words, as a result of communication between the module 100 and the terminal S, when the module 100 acquires, from the terminal S, ID information (hereinafter described as a permission ID) given with the authority to perform unlocking or locking, the ECU determines that locking and unlocking can be performed, and sends a command that instructs the locking and unlocking mechanism to perform locking and unlocking. Note that the permission ID can be stored in advance in a nonvolatile memory such as an ECU and the like. The locking and unlocking mechanism locks and unlocks the door D, based on the command. Note that, when communication of at least one of the first communication and the second communication can be performed, the module 100 sends, to the locking and unlocking mechanism, a command that instructs the locking and unlocking mechanism to perform locking and unlocking, based on a result of the communication. Hereinafter, sending, by the module 100, a command that instructs the locking and unlocking mechanism to perform locking and unlocking is simply described as a locking and unlocking command.

(Detailed Description of Locking and Unlocking Module)

As illustrated in FIG. 1, the module 100 includes a board 3 being installed with a circuit and the like serving as a communication unit, and a housing 4 that houses the board 3. The communication unit includes a first circuit 1 (one example of a first communication unit) that performs wireless communication with the terminal S by the near-range wireless communication method, a first antenna 10 (one example of a communication unit, one example of a feeding coil) being connected to the first circuit 1, a second circuit 2 (one example of a second communication unit) that performs wireless communication with the terminal S by the long-range wireless communication method, a second antenna 20 being connected to the second circuit 2, the processor C, and a storage unit M that stores a program for operating the processor C.

The board 3 includes a first board 31 that is installed with at least the first antenna 10 and has a flat plate shape, and a second board 32 that is installed with the processor C and the like and has a flat plate shape.

The first board 31 is a printed board on which the first circuit 1, the first antenna 10, the second circuit 2, and the second antenna 20 are installed, and a wiring pattern serving as electrical wiring that electrically connects the first circuit 1, the first antenna 10, the second circuit 2, and the second antenna 20 is formed. The first board 31 is formed in, for example, a hexagonal flat plate shape with one side of a rectangle extending outward in a trapezoidal shape.

The second board 32 is a printed board on which the processor C, the storage unit M, and a power source circuit (not illustrated) of the module 100 are installed, and electrical wiring is formed. The first board 32 is formed in a rectangular shape and a flat plate shape. The electrical wiring of the second board 32 is electrically connected to the electrical wiring of the first board 31 with a lead wire and the like. Note that the power source circuit is driven by power supplied from the door D (vehicle 200).

The first antenna 10 is a pattern antenna formed as a wiring pattern of the first board 31, and is formed in a coil shape. The first antenna 10 is wired along a circumference of the first board 31.

The first circuit 1 is constituted by an ASIC for performing the first communication and an electronic component such as an IC accompanying the ASIC. The first circuit 1 is electrically connected to the first antenna 10, and communicates with the terminal S by inputting or outputting an electromagnetic wave via the first antenna 10. The first circuit 1 is disposed in an inner region of ring-shaped wiring that forms the first antenna 10.

Figure 4:
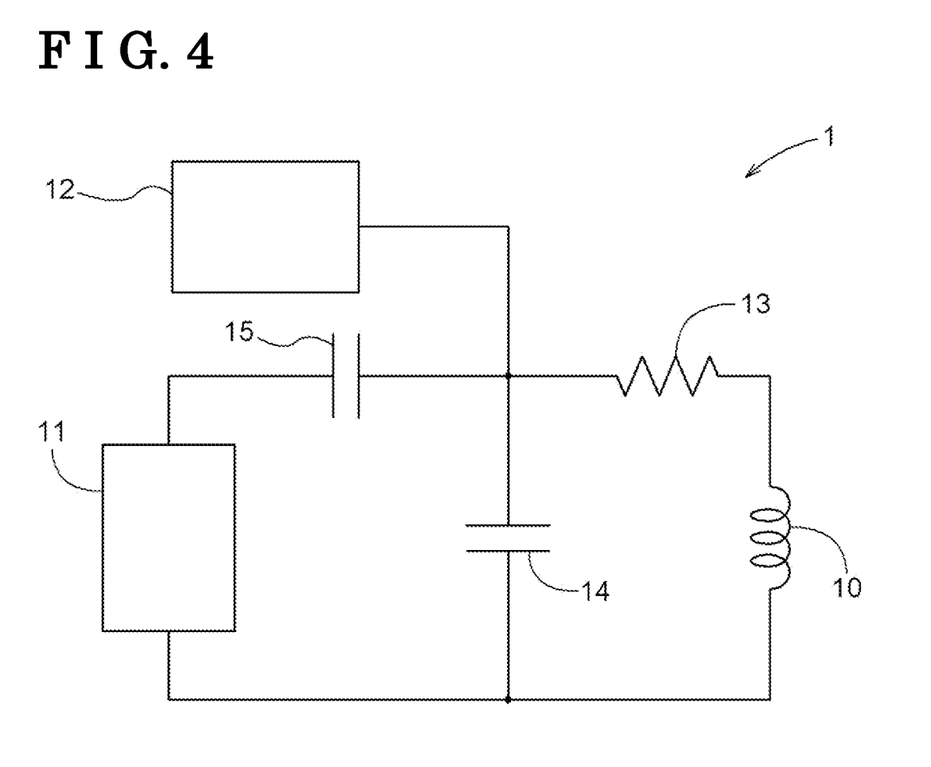
FIG. 4 is a schematic diagram of a first circuit.

FIG. 3 illustrates a schematic circuit diagram of the terminal S. FIG. 4 illustrates a schematic circuit diagram of the first circuit 1 and the first antenna 10.

As illustrated in FIG. 4, the first circuit 1 includes a drive circuit 11 that drives the first antenna 10 and causes the first antenna 10 to transmit an electromagnetic wave, a demodulation unit 12 that demodulates the electromagnetic wave received in the first antenna 10 and acquires information (for example, ID information), a resistor 13, and condensers 14 and 15. The drive circuit 11 is electrically connected in series to the condenser 15, the resistor 13, and the first antenna 10 in this order in order from one end of an electrode of the drive circuit 11. The other end of the first antenna 10 is electrically connected to another electrode of the drive circuit 11. The condenser 14 is connected to wiring between the condenser 15 and the resistor 13 and wiring on the other end side of the first antenna 10.

The drive circuit 11 transmits an unmodulated signal (applies an alternating voltage), and the signal resonates and is amplified in an RLC resonance circuit constituted by the resistor 13, the first antenna 10, and the condenser 15, and is sent as an electromagnetic wave from the first antenna 10.

When an electromagnetic wave is sent from the first antenna 10, and the electromagnetic wave is received by the terminal antenna 93 of the terminal S illustrated in FIG. 3 (one example of a feeding step), energy of the electromagnetic wave is accumulated by resonance of the RLC resonance circuit constituted by the resistor 92, the terminal antenna 93, and the condenser 94, and drives the terminal circuit 91 (one example of wireless feeding). The terminal circuit 91 drives the terminal antenna 93 with the accumulated energy, and transmits a modulated electromagnetic wave including ID information of itself from the terminal antenna 93. Therefore, when the first communication is performed, the terminal S does not necessarily require a power supply from a storage battery of itself. Even when the secondary battery is exhausted (runs down) and a power supply cannot be performed, the first communication can be performed with energy of the electromagnetic wave sent from the first antenna 10.

A signal (voltage) of the electromagnetic wave received by the first antenna 10 illustrated in FIG. 4 resonates and is amplified in the RLC resonance circuit constituted by the resistor 13, the first antenna 10, and the condenser 14, and is demodulated by the demodulation unit 12.

When the first circuit 1 performs the first communication and acquires ID information, the processor C causes the ID information to be transmitted from the first circuit 1 to the ECU. When the ECU acquires the ID information, the ECU compares the ID information with a permission ID. When the acquired ID information coincides with the permission ID, the ECU determines that locking and unlocking can be performed, and issues a locking and unlocking command.

As illustrated in FIG. 1, the second antenna 20 is a pattern antenna formed as a wiring pattern of the first board 31, and is formed in a reciprocating rectangular wave shape. The second antenna 20 is disposed in the inner region of the ring-shaped wiring that forms the first antenna 10 in the first board 31.

The second circuit 2 is constituted by an ASIC for performing the second communication and an electronic component such as an IC accompanying the ASIC. The second circuit 2 is electrically connected to the second antenna 20, and communicates with the terminal S by inputting or outputting an electromagnetic wave via the second antenna 20. The second circuit 2 is disposed in an inner region of ring-shaped wiring that forms the second antenna 20.

When the second circuit 2 performs the second communication and acquires ID information, the processor C causes the ID information to be transmitted from the second circuit 2 to the ECU. When the ECU acquires the ID information, the ECU compares the ID information with a permission ID. When the acquired ID information coincides with the permission ID, the ECU waits in a state capable of receiving a request for locking and unlocking (i.e., a state of being paired in Bluetooth communication). When the second circuit 2 receives information including a request for locking and unlocking as a result of subsequent communication by the second circuit 2, the processor C causes the ECU to send the information including the request for locking and unlocking. When the ECU acquires the information, the ECU determines that locking and unlocking can be performed, and issues a locking and unlocking command.

Figure 5:
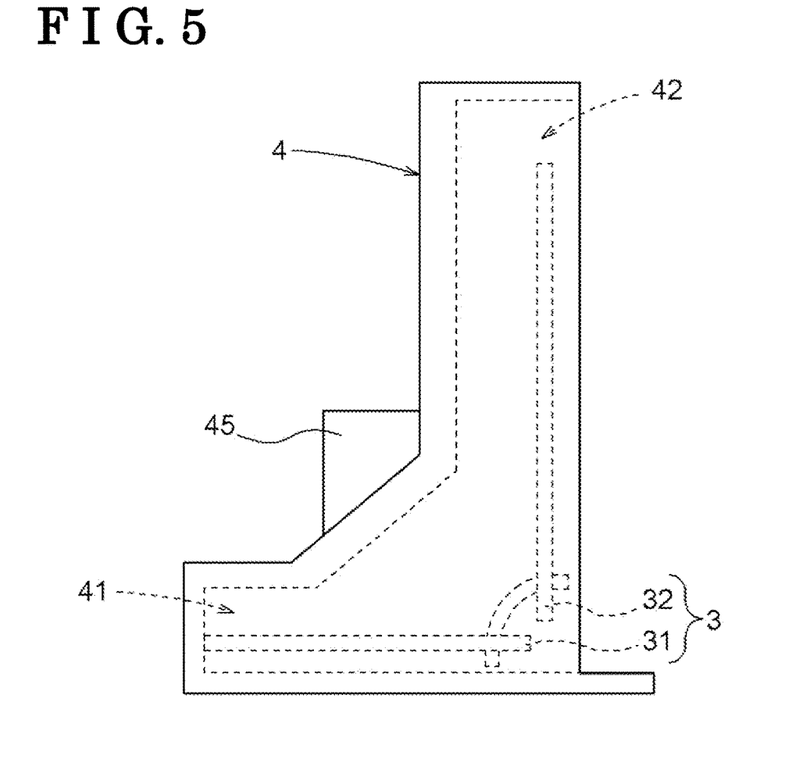
FIG. 5 is a plan view of the locking and unlocking module.

As illustrated in FIGS. 1 and 5, a first housing portion 41 that houses the first board 31, a second housing portion 42 that houses the second board 32, and a seat portion 45 (one example of a fixed portion) that fixes the housing 4 to the door D (see FIG. 2) with a screw and the like are formed in the housing 4. The housing 4 is formed of a material (in the present embodiment, a material with resin as a base material) that does not block an electromagnetic wave and the like.

The first housing portion 41 is a housing container having a plate-like box shape having a slight thickness, and having an internal space that houses the entire first board 31. A surface of the first housing portion 41 that faces a surface of the first board 31 and faces an outside of the housing 4 is formed in a planar shape.

The second housing portion 42 is a housing container having a plate-like box shape having a slight thickness, and having an internal space that houses the entire second board 32. The second housing portion 42 houses the second board 32 in a state where a plane (one example of a virtual plane) parallel to the second board 32 is orthogonal to a plane parallel to the first board 31, and the plane parallel to the second board 32 does not intersect the first board 31. In other words, the second board 32 does not overlap the first board 31 in a plan view of the first board 31.

One end of the second housing portion 42 in a longitudinal direction is integrally coupled to one end of the first housing portion 41. A plate surface of the second housing portion 42 is orthogonal to a plate surface of the first housing portion 41. In other words, the housing 4 is formed in an L shape in which the first housing portion 41 extends from one end of the second housing portion 42 to one side in a direction orthogonal to an extending direction of the second housing portion 42. Hereinafter, in the module 100 (housing 4), a side in the extending direction of the second housing portion 42 on which the first housing portion 41 is formed may be described as a front side, and an opposite side thereof may be described as a rear side.

The seat portion 45 is a screw seat including a screw hole (not illustrated) through which a bolt screw, a screw, or the like (hereinafter simply described as a screw) is inserted. The seat portion 45 is integrally formed with the second housing portion 42 in a position closer to an end portion on a side coupled to the first housing portion 41 on a side of the second housing portion 42 on which the first housing portion 41 extends when viewed from the second housing portion 42. The screw hole of the seat portion 45 extends in parallel with the second housing portion 42 and toward the first housing portion 41, for example. The seat portion 45 and the first housing portion 41 are separated, and a gap is formed therebetween.

(Fixing of Locking and Unlocking Module)

Figure 6:
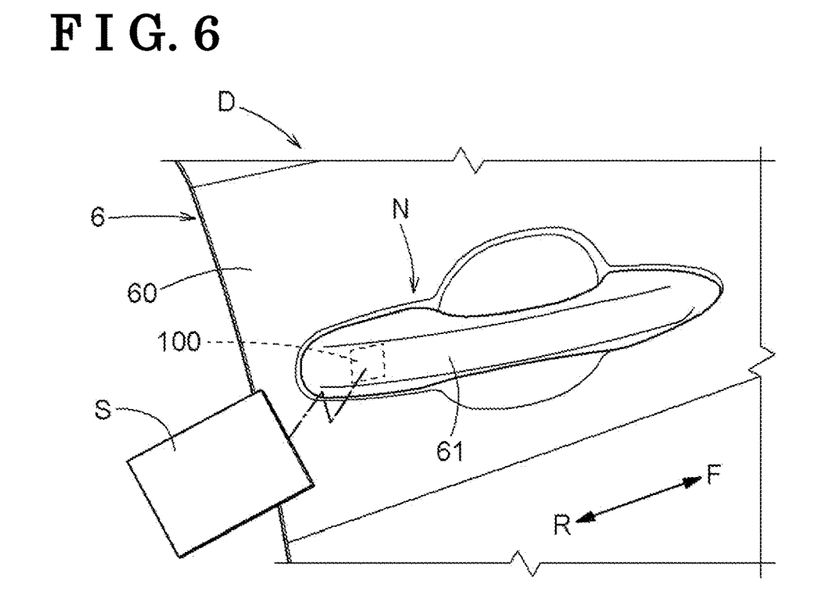
FIG. 6 is a diagram when the vicinity of a door handle of a vehicular door is viewed from a lateral outside of a vehicle.

FIG. 6 is a diagram when the vicinity of the door handle N of the door D is viewed from a lateral outside of the vehicle 200. The door D includes a vehicle body 60 (one example of a body) that is a metal plate portion of a door body 6, and the door handle N mounted on the door body 6.

The door handle N includes a handle case 61 (one example of an open and close operation portion) that is a handle for opening and closing the door D by a user, and a support frame 62 of the handle case 61. The module 100 is installed inside the vehicle 200 when viewed from the handle case 61 on the rear R side of the door handle N, and the lateral outside of the vehicle 200 is covered with the handle case 61. The handle case 61 is formed of a material (in the present embodiment, a material with resin as a base material) that does not block an electromagnetic wave and the like. When a user desires to lock and unlock the door D, the user can perform the first communication, and lock and unlock the door D by holding the terminal S in the vicinity of the rear R side of the door handle N. Note that the vicinity of the rear R side of the door handle N is a place where a cylinder of a key for locking and unlocking is installed in a conventional vehicle. By installing the module 100 on the rear R side of the door handle N, a user can perform locking and unlocking by making a movement similar to a conventionally familiar operation, and thus an excellent feeling of use can be provided to the user.

Figure 7:
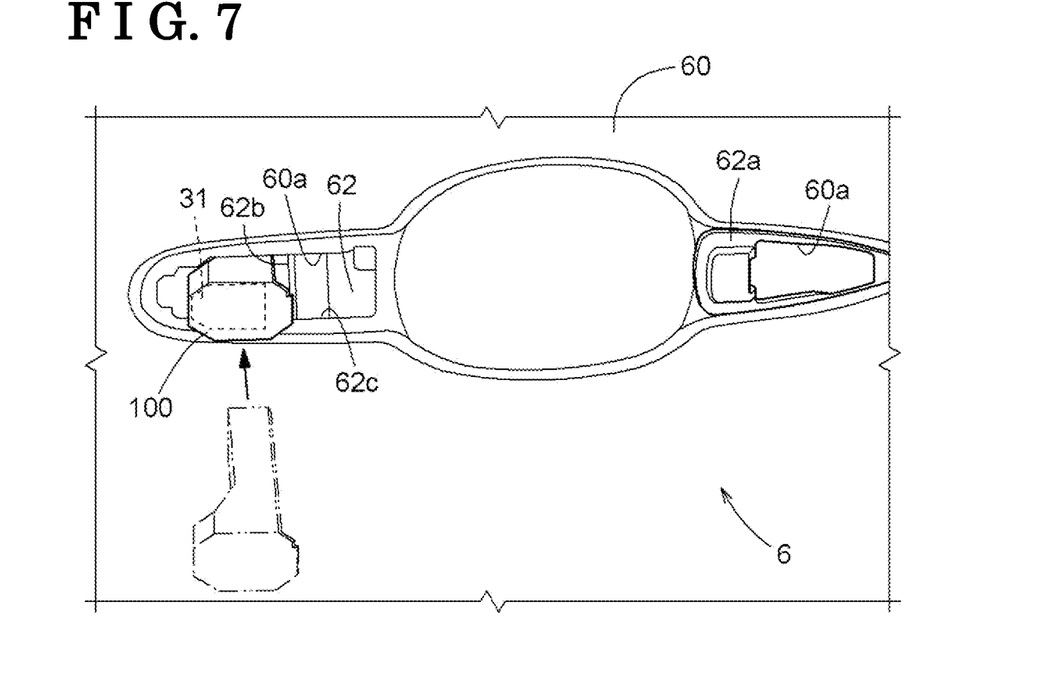
FIG. 7 is a diagram when the vicinity of the door handle of the vehicular door with the door handle being removed is viewed from the lateral outside of the vehicle.
Figure 8:
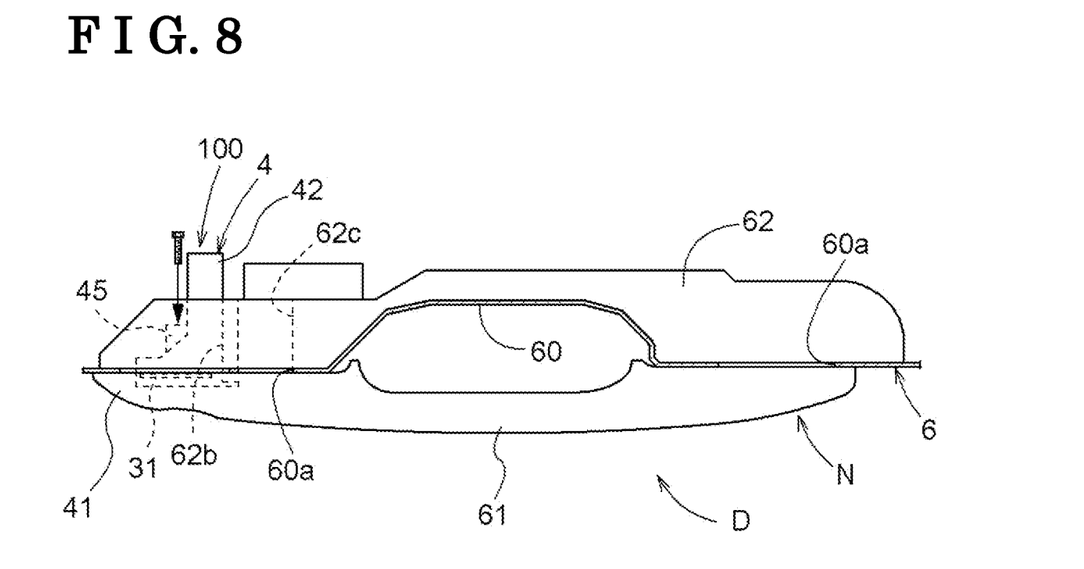
FIG. 8 is a cross-sectional view of a lateral outside portion of the door in a plan view.

FIG. 7 is a diagram when the vicinity of the door handle N of the door D is viewed from the lateral outside of the vehicle 200, and is a diagram with the door handle N being removed when viewed from the lateral outside of the vehicle 200. FIG. 8 is a schematic cross-sectional view of the door D in a plan view for illustrating an attachment manner of the door handle N and the module 100 to the door body 6. As illustrated in FIG. 8, the handle case 61 of the door handle N, the vehicle body 60 of the door body 6 of the door D, and the support frame 62 of the door handle N are disposed from the lateral outside of the vehicle 200 (see FIG. 2) toward an inside. The handle case 61 is disposed in such a way as to overlap the support frame 62 when viewed along a width direction of the vehicle 200. Note that the width direction of the vehicle 200 refers to a direction that intersects the front-rear direction and is parallel to the ground. Hereinafter, the same direction as the width direction of the vehicle 200 is simply described as a width direction.

As illustrated in FIGS. 7 and 8, a pair of door handle fixing holes 60a that penetrate the vehicle body 60 are formed in the vehicle body 60. The support frame 62 that supports the handle case 61 (see FIG. 8) in such a way as to be rotatably operatable is disposed on an inside (compartment side) of the vehicle body 60 (see FIG. 2). The door handle N is fixed to the door handle fixing holes 60a.

An insertion hole 62b (one example of a module holding portion) through which the module 100 is inserted and mounted from the rear side, and a fixing hole 62c to which the handle case 61 is attached are formed inside an outer edge of the support frame 62. A pair of the fixing holes 62c (only one of the fixing holes 60c is illustrated, and the other is not illustrated) are formed, and each of the fixing holes 60c is disposed in such a way as to overlap the door handle fixing hole 60a when viewed from the width direction.

As illustrated in FIG. 7, the support frame 62 is fixed to the vehicle body 60 by pairing up with a fastener 62a and sandwiching a circumference of the door handle fixing hole 60a via the door handle fixing hole 60a. In this way, the door handle N is installed (fixed) to the vehicle body 60 in a state where the support frame 62 disposed inside the vehicle body 60 and the handle case 61 disposed outside the vehicle body 60 sandwich the vehicle body 60.

The insertion hole 62b holds the module 100 in a state where the rear side of the module 100 faces inside in the width direction. The module 100 is fixed and held by being fit into the support frame 62 in a state where the housing 4 is inserted through the insertion hole 62b from the outside in the width direction. When the module 100 is fixed and held in such a manner, the module 100 is attached by fixing, by a fixing member such as a screw from the inside of the vehicle body 60, the seat portion 45 being molded integrally with the housing 4. The insertion hole 62b is formed in an inner shape conforming to an outer shape of the housing 4 in such a way that the inserted housing 4 of the module 100 is closely fit into the insertion hole 62b. In the present embodiment, the insertion hole 62b has the same shape as that of a hole holding a cylinder of a conventional key device.

The insertion hole 62b is disposed in the same position as that when the cylinder of the conventional key device is held. An installation height of the insertion hole 62b from the ground is the same height as that at which the cylinder of the conventional key device is held. FIGS. 7 and 8 illustrate a case where the insertion hole 62b has the same height as that of the handle case 61, and is disposed on the rear R side of the door handle N. The insertion hole 62b may be disposed on the front F side of the door handle N. The insertion hole 62b is disposed in such a way as to overlap the door handle fixing hole 60a when viewed from the width direction.

Since the handle case 61 is disposed in such a way as to overlap the support frame 62 when viewed along the width direction, the insertion hole 62b and the module 100 inserted through the insertion hole 62b are disposed in the vicinity of a place where a cylinder of a conventional key for locking and unlocking is disposed.

In addition, as illustrated in FIG. 8, the module 100 is fixed to the door body 6 by the portion of the seat portion 45 being screwed to the vehicle body 60.

As illustrated in FIGS. 7 and 8, in the module 100, the first board 31 (first antenna 10) is disposed on the lateral outside of the vehicle 200 of the door body 6. The first board 31 is disposed in such a way as to be flush with the vehicle body 60 or protrude to the lateral outside of the vehicle 200 longer than the vehicle body 60. The first board 31 is disposed along the surface of the vehicle body 60.

(Locking and Unlocking Operation)

When a user desires to lock and unlock the door D while being in a position away from the vehicle 200, the user can instruct the module 100 to perform locking and unlocking (transmit information including a request for locking and unlocking) by an operation of the terminal S and the like in a case where the terminal S and the module 100 can perform the second communication. However, when an operation of the terminal S cannot be performed as in a case where the storage battery of the terminal S runs down, or when the user is in front of the door D, the user can cause the first communication to be performed by holding the terminal S in the vicinity of the end portion on the rear R side of the door handle N, and can instruct the module 100 to lock and unlock the door D.

As described above, a locking and unlocking module that can be used by selecting an appropriate communication method as appropriate from among a plurality of communication methods can be provided.

Figure 9:
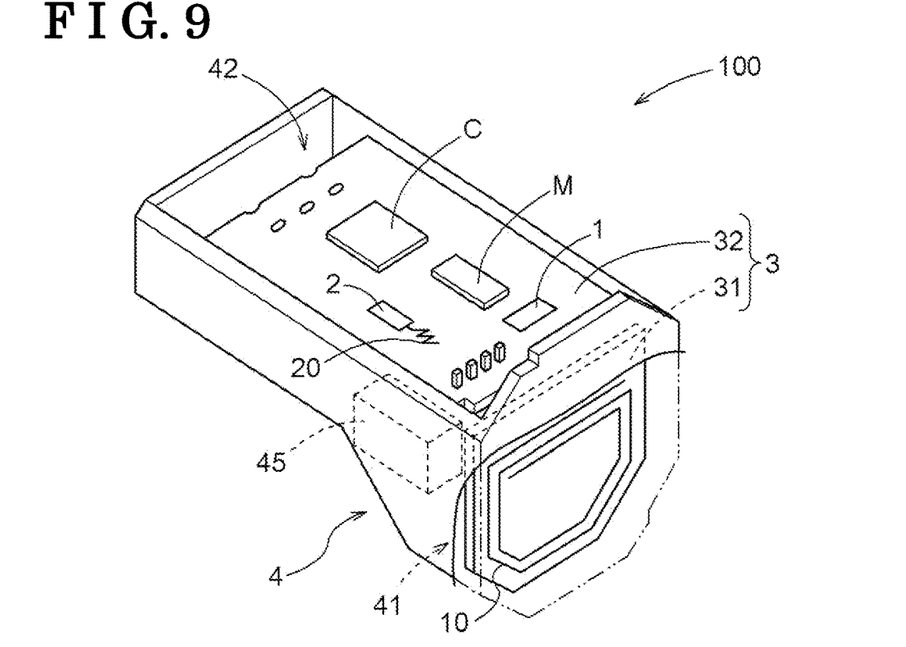
FIG. 9 is a perspective view of a different locking and unlocking module.

Other Embodiment (1) In the embodiment described above, the case where, in the module 100, the first circuit 1, the first antenna 10, the second circuit 2, and the second antenna 20 are installed on the first board 31, and the processor C and the storage unit M are installed on the second board 32 is described. However, as illustrated in FIG. 9, in the module 100, the first antenna 10 may be installed on the first board 31, and the first circuit 1, the second circuit 2, the second antenna 20, the processor C, and the storage unit M may be installed on the second board 32.

When the first antenna 10 is installed on the first board 31, and the first circuit 1, the second circuit 2, the second antenna 20, the processor C, and the storage unit M are installed on the second board 32, it is preferable that the second antenna 20 does not overlap the first board 31 in a plan view of the first board 31 (see FIG. 5). The second antenna 20 does not overlap the first board 31 in such a manner, and thus an electromagnetic wave for the second communication is not blocked by the first board 31 or the first antenna 10 installed on the first board 31, and interference with each other in the first communication via the first antenna 10 and the second communication via the second antenna 20 can be avoided. Thus, appropriate communication can be performed.

(2) In the embodiment described above, the case where the module 100 is configured to be able to communicate with the terminal S in two types of communication methods of the near-range wireless communication method and the long-range wireless communication method is described. However, the module 100 may be configured to be able to communicate with the terminal S in two types of different near-range wireless communication methods. In this case, a communication method in which the terminal S can perform communication without requiring a power supply from a storage battery of itself may be adopted as at least one of the communication methods.

(3) In the embodiment described above, the case where the second board 32 does not overlap the first board 31 in the plan view of the first board 31 is described. However, the second board 32 may overlap the first board 31 in the plan view, and, even in this case, communication between the module 100 and the terminal S can be performed.

(4) In the embodiment described above, the case where the first board 31 (first antenna 10) is disposed on the lateral outside of the vehicle 200 of the door body 6, and is disposed in such a way as to be flush with the vehicle body 60 or protrude to the lateral outside of the vehicle 200 longer than the vehicle body 60 is described. However, the first board 31 (first antenna 10) may be disposed inside the vehicle 200 further than the vehicle body 60, and, even in this case, communication between the module 100 and the terminal S can be performed.

(5) In the embodiment described above, the case where the module 100 is installed inside the vehicle 200 when viewed from the handle case 61 on the rear R side of the door handle N is described. However, the module 100 may be installed inside the vehicle 200 when viewed from the handle case 61 on the front F side of the door handle N.

(6) In the embodiment described above, the case where the module 100 is installed inside the vehicle 200 when viewed from the handle case 61 on the rear R side of the door handle N, and the lateral outside of the vehicle 200 is covered with the handle case 61 is described. However, as long as the module 100 is installed in the vicinity of the door handle N, a feeling of use is excellent for a user. In this case, the module 100 may not be covered with the handle case 61. For example, the module 100 may be located and installed in a lower portion in the vertical direction of the door handle N. Further, the module 100 may be located and installed on the rear R side of the door handle N and in the lower portion in the vertical direction of the door handle N. The module 100 in the lower portion of the door handle N is closer to a hand of a user than the module 100 in an upper portion, and a feeling of use is excellent for the user. In this case, it is preferable that the first board 31 is disposed in such a way as to be flush with the vehicle body 60, or is disposed on the lateral outside of the vehicle 200 further than the vehicle body 60. Further, in this case, the module 100 may be configured to be housed in the support frame 62, but the module 100 may also be configured to be fixed to the door body 6 only by screwing of the seat portion 45 to the vehicle body 60 and the like without being housed in the support frame 62.

(7) In the embodiment described above, the case where the ECU determines locking and unlocking is described. However, there is also a case where the module 100 (processor C) determines locking and unlocking.

(8) In the embodiment described above, the case where the first communication is the NFC communication method and the second communication is Bluetooth is exemplified. However, the first communication and the second communication may be another communication method. For example, the first communication may adopt another communication method such as RFID. The second communication may also adopt a communication method such as Wi-Fi and ZigBee (registered trademark), and may be a so-called UWB.

(9) In the embodiment described above, the case where the module 100 is fixed and held by being fit into the support frame 62 with the housing 4 being inserted through the insertion hole 62*b*, and the module 100 is fixed to the door body 6 with the portion of the seat portion 45 of the module 100 being screwed to the vehicle body 60 is described. However, the module may be at least fixed and held in the support frame 62, and may not be directly fixed to the door body 6.

(10) In the embodiment described above, the case where the module 100 is fixed and held by being fit into the support frame 62 with the housing 4 being inserted through the insertion hole 62*b* is described. However, the module 100 may be fixed to the support frame 62 by another method such as screwing and snap-fitting.

Figure 10:
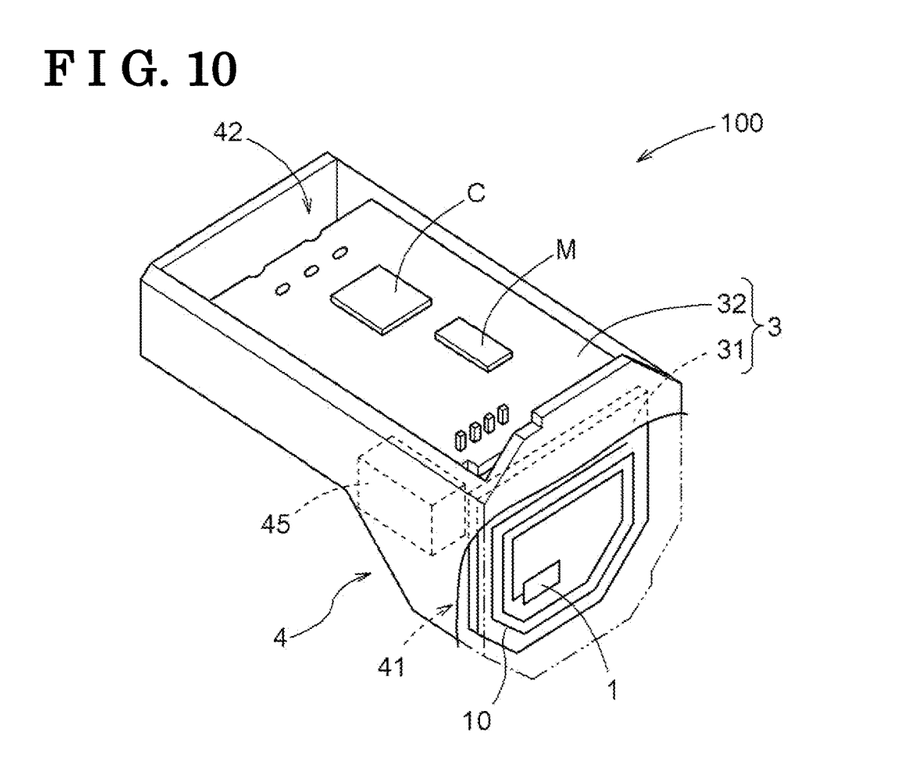
FIG. 10 is a perspective view of a different locking and unlocking module.

(11) In the embodiment described above, the case where the module 100 is configured to be able to communicate with the terminal S in two types of the communication methods of the near-range wireless communication method (one example of the first communication method) and the long-range wireless communication method (one example of the second communication method), and the module 100 includes the board 3 being installed with the circuit and the like such as the first circuit 1 (one example of the first communication unit) that performs wireless communication with the terminal S by the near-range wireless communication method, the first antenna 10 (one example of the feeding coil) being connected to the first circuit 1, the second circuit 2 (one example of the second communication unit) that performs wireless communication with the terminal S by the long-range wireless communication method, and the second antenna 20 being connected to the second circuit 2, and the housing 4 that houses the board 3 is described. However, as illustrated in FIG. 10, the module 100 may include the board 3 being installed with at least the first antenna 10 being connected to the first circuit 1 that performs wireless communication with the terminal S by the near-range wireless communication method, and the housing 4 that houses the board 3.

A locking and unlocking module according to this disclosure includes a communication unit that performs, with a wireless communication terminal, communication for determining whether unlocking or locking of a door of a vehicle is enabled, a board being installed with the communication unit, and a housing that houses the board. The housing is housed in a support frame of a body of the door that supports an open and close operation portion of the door outside in a width direction of the vehicle in such a way as to be operatable.

According to the configuration described above, since the housing is housed in the support frame, the communication unit can be disposed in the vicinity of the open and close operation portion such as a handle and inside in the width direction of the vehicle further than the open and close operation portion. In this way, a user can perform locking and unlocking by causing communication for determining whether unlocking or locking of the door of the vehicle is enabled, to be performed between the wireless communication terminal and the communication unit by an operation and in a position that have been conventionally familiar and are similar to those in a case where locking and unlocking are performed by a key.

In the locking and unlocking module according to this disclosure, the communication unit may include a first communication unit that performs wireless communication with the wireless communication terminal by a first communication method, and a first antenna being connected to the first communication unit, the board may include a first board being installed with the first antenna, and the first board may be disposed outside in the width direction in the housing and face outside in the width direction.

According to the configuration described above, the first board being installed with the first antenna is disposed outside in the width direction of the vehicle in the housing, and the first board faces outside in the width direction. In this way, since the first antenna is disposed outside in the width direction of the vehicle, and the first board faces outside in the width direction, communication in the vicinity of the open and close operation portion can be easily performed.

In the locking and unlocking module according to this disclosure, the communication unit may further include a control unit that controls communication for determining whether unlocking or locking of the door is enabled, a second communication unit that performs wireless communication with the wireless communication terminal by a second communication method, and a second antenna being connected to the second communication unit, the board may further include a second board being installed with the second antenna, the second board may be disposed on a virtual plane that intersects the first board, the first communication method may be a method of communicating with the wireless communication terminal being installed with a storage battery device, and the control unit may perform the communication by switching between the first communication unit and the second communication unit.

As described in the description of the prior art, the locking and unlocking module (circuit of the keyless entry system) is sometimes installed in a door handle or in the vicinity thereof. However, it is not easy to install the locking and unlocking module in accordance with a plurality of communication methods in a small structure such as the door handle. In contrast, according to the configuration described above, the board is divided into the first board being installed with at least the first antenna and the second board being installed with another electronic component, and, furthermore, surfaces of the first board and the second board are disposed in a positional relationship in such a way as to intersect each other, and thus a size of the board and the locking and unlocking module can be reduced.

According to the configuration described above, the first communication unit can perform wireless communication with the wireless communication terminal by the first communication method by using the first antenna, and the second communication unit can perform wireless communication with the wireless communication terminal by the second communication method by using the second antenna.

Then, the first communication unit and the second communication unit separately perform communication (hereinafter described as first communication) by the first communication method and communication (hereinafter described as second communication) by the second communication method, respectively. When the communication is performed, the control unit switches between the first communication unit and the second communication unit and performs the first communication or the second communication, and communication for determining whether unlocking or locking of a door of a vehicle (hereinafter described as a vehicular door) can be performed.

In the locking and unlocking module according to this disclosure, the second communication method may be a method that allows long-range communication to be performed farther than the first communication method.

According to the configuration described above, the long-range communication can be performed by the second communication method, and the near-range communication can be performed by the first communication method or the second communication method. In this way, an appropriate communication method can be selected according to a distance to a vehicle. Particularly, for a near range, an appropriate communication method can be selected according to a characteristic of a communication method. For example, a communication method performed in a near range to the extent that the wireless communication terminal is held in front of the first antenna can be selected for the near-range communication, and a communication method that allows communication to be performed in a longer range can be selected for the long-range communication.

In the locking and unlocking module according to this disclosure, the first antenna may be formed in a ring shape parallel to the first board, and the second antenna may be installed on the first board, and disposed in an inner region of a ring of the first antenna.

According to the configuration described above, a reduction in size of the locking and unlocking module can be achieved by installing both antennas of the first antenna and the second antenna on the first board, and transmission-reception (communication) of an electromagnetic wave can also be performed excellently by reducing interference with each other between the first antenna and the second antenna.

In the locking and unlocking module according to this disclosure, in a plan view of the first board, the second antenna may not overlap the first board.

According to the configuration described above, the second antenna is not blocked by the first board. Thus, the second communication unit can excellently perform the second communication.

In the locking and unlocking module according to this disclosure, the housing may include a fixed portion being fixed to the body of the door, and the first antenna may be disposed at the rear of the vehicle with respect to the open and close operation portion.

According to the configuration described above, the housing can be directly fixed to the body of the door (door body installed with the open and close operation portion), and the locking and unlocking module can be used integrally with the door, and thus durability improves. Further, since the first antenna is always disposed in the vicinity of a place where a cylinder of a conventional key for locking and unlocking is disposed, such as a vehicle rear side, a vehicle front side, or a lower side with respect to the open and close operation portion, in a state where the locking and unlocking module is fixed to the door, a user can perform locking and unlocking in an operation position that has been conventionally familiar and is similar to that in a case where locking and unlocking are performed by the key. Thus, an excellent feeling of use can be provided to the user.

In the locking and unlocking module according to this disclosure, the housing may include a fixed portion being fixed to the door, and the first antenna may be disposed in such a way as to protrude from the body of the door to outside.

In the locking and unlocking module, an arrangement of an antenna that does not block an electromagnetic wave to be used for wireless communication needs to be considered while reducing the size. Further, in a case of a structure in which a door handle is movable, contrivance of not having an influence of stress due to a movement of the door handle on a module is needed. Thus, according to the configuration described above, since the housing can be directly fixed to the door, and the locking and unlocking module can be used integrally with the door, durability improves. Further, since the first antenna is always disposed in such a way as to protrude from the door to a vehicle lateral outside in a state where the locking and unlocking module is fixed to the door, excellent communication can be achieved without an electromagnetic wave of the first communication being blocked by the body (metal plate) of the door.

In the locking and unlocking module according to this disclosure, the housing may include a fixed portion being fixed to the body of the door, and the first antenna may be disposed on a lower side in a vertical direction with respect to the open and close operation portion.

According to the configuration described above, the housing can be directly fixed to the body of the door, and the locking and unlocking module can be used integrally with the door, and thus durability improves. Further, since the first antenna is always disposed in the vicinity of a place where a cylinder of a conventional key is disposed, such as a lower side in the vertical direction of the vehicle with respect to the open and close operation portion, in a state where the locking and unlocking module is fixed to the door, a user can perform locking and unlocking in an operation position that has been conventionally familiar and is similar to that in a case where locking and unlocking are performed by the key. Further, since the first antenna is disposed in the vicinity of a hand of the user, the user can perform locking and unlocking in a comfortable posture. Thus, an excellent feeling of use can be provided to the user.

A door handle module according to this disclosure includes the locking and unlocking module described above, an open and close operation portion of a door of a vehicle, and a support frame that is disposed inside a body of the door in a width direction of the vehicle, and supports the open and close operation portion outside the body in the width direction of the vehicle in such a way as to be operable. The support frame includes a module holding portion that houses the locking and unlocking module. Note that the width direction of the vehicle refers to a direction that intersects the front-rear direction and is parallel to the ground.

According to the configuration described above, in a manner in which the open and close operation portion is disposed outside the body (metal plate) of the door in the width direction of the vehicle, the support frame is disposed inside the body, and the support frame and the open and close operation portion sandwich the body, the open and close operation portion can be fixed and installed in the door by the support frame. At this time, the locking and unlocking module can be installed in the door while being housed in the module holding portion formed in the support frame. In this way, a user can perform locking and unlocking in the vicinity of an operation position that has been conventionally familiar and is similar to that in a case where locking and unlocking are performed by inserting a key into a cylinder.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A locking and unlocking module, comprising:
    a communication unit that performs, with a wireless communication terminal, communication for determining whether unlocking or locking of a door of a vehicle is enabled;
    a board installed with the communication unit; and
    a housing that houses the board, wherein
    the housing is housed in a support frame of a body of the door that supports an open and close operation portion of the door outside in a width direction of the vehicle in such a way as to be operatable,
    the communication unit includes:
        a first communication unit that performs wireless communication with the wireless communication terminal by a first communication method,
        a first antenna connected to the first communication unit,
        a control unit that controls communication for determining whether unlocking or locking of the door is enabled,
        a second communication unit that performs wireless communication with the wireless communication terminal by a second communication method, and
        a second antenna connected to the second communication unit,
    the board includes:
        a first board installed with the first antenna, the first board disposed outside in the width direction in the housing and faces outside in the width direction, and
        a second board installed with the second antenna, the second board disposed on a virtual plane that intersects the first board,
    the first communication method is a method of communicating with the wireless communication terminal installed with a storage battery device, and
    the control unit performs the communication by switching between the first communication unit and the second communication unit.

2. The locking and unlocking module according to claim 1, wherein
    the second communication method is a method that allows long-range communication to be performed farther than the first communication method.

3. The locking and unlocking module according to claim 1, wherein
    the first antenna is formed in a ring shape parallel to the first board, and
    the second antenna is installed on the first board, and is disposed in an inner region of a ring of the first antenna.

4. The locking and unlocking module according to claim 1, wherein,
    in a plan view of the first board, the second antenna does not overlap the first board.

5. The locking and unlocking module according to claim 1, wherein
    the housing includes a fixed portion fixed to the body of the door, and
    the first antenna is disposed on a vehicle rear side, a vehicle front side, or a lower side with respect to the open and close operation portion.

6. The locking and unlocking module according to claim 1, wherein
    the housing includes a fixed portion fixed to the door, and
    the first antenna is disposed in such a way as to protrude from the body of the door to outside.

7. The locking and unlocking module according to claim 1, wherein
    the housing includes a fixed portion fixed to the body of the door, and
    the first antenna is disposed on a lower side in a vertical direction with respect to the open and close operation portion.

8. A door handle module, comprising:
    the locking and unlocking module according to claim 1;
    the open and close operation portion of the door of the vehicle; and
    the support frame that is disposed inside the body of the door in the width direction of the vehicle, and supports the open and close operation portion outside the body in the width direction of the vehicle in such a way as to be operatable, wherein
    the support frame includes a module holding portion that houses the locking and unlocking module.

* * * * *